United States Patent Office 3,176,460
Patented Apr. 6, 1965

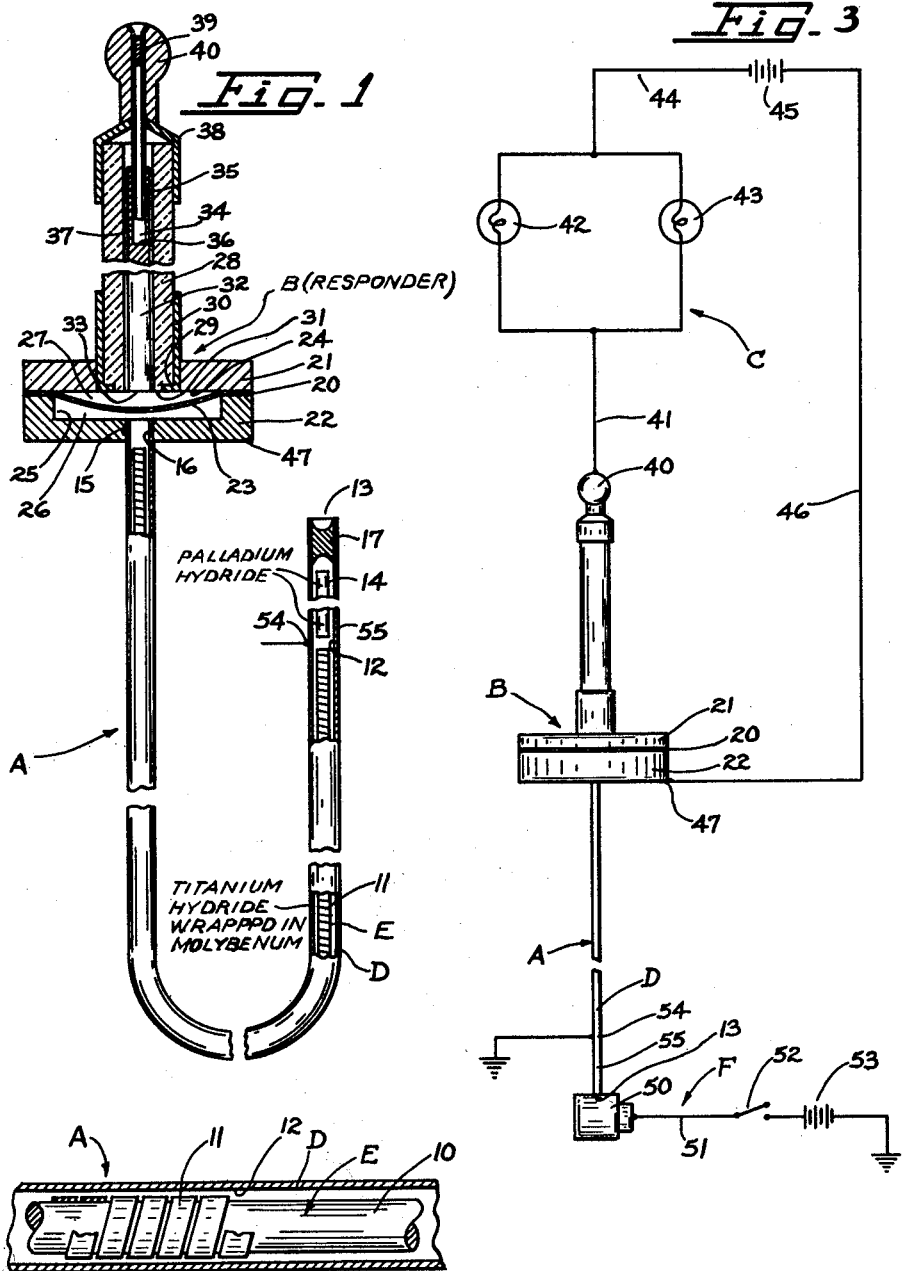

3,176,460
HEAT DETECTION APPARATUS
John E. Lindberg, Alamo, Calif.
(1211 Upper Happy Valley Road, Lafayette, Calif.)
Original application Nov. 23, 1962, Ser. No. 239,440.
Divided and this application Apr. 20, 1964, Ser. No. 367,272
1 Claim. (Cl. 60—24)

This application is a division of application Serial Number 239,440, filed November 23, 1962.

This invention relates to an improved apparatus for heat detection and especially fire detection. More particularly it relates to a novel heat-detection sensor, to a heat-detection system having integrity test means, and to a heat-detection system without electrical relays.

The present invention is an improvement of the apparatus described and claimed in my co-pending application Serial No. 102,622, filed April 10, 1961, now abandoned. That application provides a novel non-electric heat-detecting element or sensor located in a heat-detection zone and connected outside the zone to an electrical warning or corrective system by a novel instrument called a responder. The sensor may be filamentary, a long, very-narrow-diameter, hollow tube, which may extend along a line, around a circle, or along any desired path and for practically any desired length. Also, the actual alarm or heat-condition indicator can be connected to the responder by a wire of practically any desired length. For example, the heat-detecting sensor may be inside a house, the responder just outside the house, and the indicator at the fire station. Or, the non-electric heat-detecting sensor may be in zone 1 of an aircraft engine ahead of a fire wall, the responder may be behind the fire wall, and the indicator may be on the aircraft instrument panel.

Conventional fire detectors employed in aircraft for zone-1 fire detection, whether of the continuous type or of the single-point type, have been liable to give false alarms. For example, a prevailing type of continuous fire detector is actuated by the change in electrical resistance of semi-conducting materials caused by a change in environmental temperature. Moisture, however, can produce the same effect as high temperatures. Moisture conditions in the engine chambers, where zone-1 detectors are located, vary considerably, because changes in altitude radically affect the temperature and pressure conditions there. As a consequence, moisture condensation occurs frequently and has often caused these electrical fire-detectors to develop low-resistance shorts that resulted in false alarms. False alarms are serious enough on the ground, as everyone knows, but in aircraft they are unforgiveable, because the crew must immediately take hazardous and expensive emergency action.

The present invention solves the false-alarm problem. Like the device described in application Serial No. 102,622, the sensor is never actuated by moisture or by atmospheric conditions. In addition, it includes an improved circuit and a greatly improved testing apparatus.

Such troubles as poor electrical connections at the joints between successive elements of continuous-type detectors, and the accumulation of foreign material in the connections, both leading to heating at the joints, cannot occur in this invention. My invention uses only the simplest electrical connections.

Some prior-art types of fire detectors have given false alarms because they responded to the *rate of change* of temperature rather than, or in addition to, a predetermined high *temperature level*. Consequently, during airplane takeoff, when the temperature in the power-plant area was increasing very rapidly, these detectors sometimes gave false alarms when everything was normal. The same thing happened during rapid climbing and some other operating conditions. The device of this invention is not affected by the rate of change of temperature; so another source of false alarms is eliminated.

Prior-art continuous-type fire detectors also gave false alarms whenever the detector element was seriously damaged, because short circuits were then caused within the element. The sensor of the present invention can be completely severed, cut open, dented, or bent in any fashion without causing a false alarm. Moreover, the integrity test device discloses whether the sensor is operable or inoperable.

A very important object of the invention is to provide means for giving a complete test of the unit. The test is positive: if the test shows that the unit will work, the unit will work, and if it shows that the unit will not work, the unit will not work.

A further object is to provide a fire detector capable of indefinitely recycling to give warning each time a critical elevated temperature is reached and to withdraw the warning each time the temperature drops.

Another object is to provide a completely hermetically sealed heat-detection transducer, completely free from environmental errors caused by such things as pressure and altitude changes, moisture condensation, and so on.

Another object is to provide a fire-detection system which avoids the complexities characteristic of other fire detectors. For example, no amplifiers or relays need be used in this system. This solves an important problem, because heretofore fire detection systems for a four-engine airplane have required more than ten relays, each heavy, each an expense.

Another object of the invention is to enable the use of several non-electric heat-detecting transducers in combination with a single electrical circuit, to achieve simplicity while still pinpointing which transducer has been actuated.

Other objects and advantages of the invention will appear from the following description of some illustrative embodiments thereof.

In the drawings:

FIG. 1 is an enlarged view in elevation and partly in section of a sensor-responder unit embodying the principles of the invention; since a typical sensor is in the order of twenty feet long, it has been broken in a few places to conserve space, but in actual practice it is continuous.

FIG. 2 is an enlarged fragmentary view in elevation and partly in section of a portion of the sensor of FIG. 1.

FIG. 3 is a partly diagrammatic view in elevation of a simple circuit utilizing the sensor-responder unit of FIG. 1.

As shown in FIG. 3, the fire-detection system of this invention preferably comprises (1) a non-electric detection means, preferably in the form of a generally filamentary sensor A of some desired length, (2) a responder B, and (3) an electrical circuit C. The function of the sensor A is to actuate the responder B, which in turn actuates the electrical circuit C. Thus, the sensor A constitutes a heat-to-pressure transducing means, while the sensor A and the responder B, considered together, comprise a heat-to-electric-current transducer.

The sensor A may be further defined in general terms (see FIGS. 1 and 2) as a generally filamentary enclosure D of extended length connected to the responder B and containing means E responsive to heat in the environment of the sensor A, for raising the internal pressure in the responder B. The responder B is a type of pressure-actuated electrical switch that opens or closes in response to the pressure changes induced by the response of the sensor A to heat. The electrical circuit C may be a warning circuit or a remedial circuit.

The system of this invention has many features especially suitable to use in aircraft. Just to give a general idea, a sensor A may used, at each engine nacelle of an airplane, disposed in some critical locations, usually around the engines. The responder B may be mounted on a fire wall just back of the engines. The circuit C may lead to warning lights and bells on the aircraft instrument panel.

Preferably, the tube D is of metal, is gas tight, is narrow in diameter and has a constant cross-sectional area over its length. Within this tube D, the means E is responsive to the temperature of the tube D for varying the pressure inside the tube. This means E may also be termed a transducing agent or a gas-transfer or gas-emitting agent. The enclosure D is connected to the responder B, which itself defines a closed chamber connected to the enclosure D. An alteration of the internal pressure within the enclosure D therefore affects the internal pressure within the responder B.

This invention preferably employs as transducing agents E metallic hydrides that retain hydrogen at low temperatures and emit hydrogen gas progressively over a wide range of elevated temperatures. These are set out in detail in my copending application Serial No. 102,622, now abandoned, to which reference may be had for complete details. With the alkali and alkaline earth metals, i.e., groups I-a and II-a of the periodic table, hydrogen forms stoichiometric compounds such as sodium hydride and calcium hydride. These are ionic in behavior, with hydrogen as the negative ion. The reactions are reversible and exothermic. Specifically, hydrogen reacts with lithium, sodium, potassium, rubidium, cesium, francium, calcium, strontium, barium, and radium in stoichiometric proportions to form hydrides. With the elements of Groups III-a (including the rare earth and actinide elements), IV-a and V-a, and with palladium, hydrogen forms pseudo-hydrides. The solubility of hydrogen in elements of these groups varies as the square root of the pressure, and it decreases with increase in temperature. This class consists of scandium, titanium, vanadium, ytterbium, zirconium, niobium, hafnium, tantalum, the rare earth metals (atomic numbers 57 through 71), the actinide metals (atomic numbers 89 through 103), and palladium. This solution is commonly termed a "hydride," though it is not a stoichiometric compound.

My co-pending application, Serial No. 102,622, illustrates a few of the many ways in which the sensor A may be constructed. Transducing agents E may be used in a filamentary pellet, or granular form, always being placed inside the sensor tube D, which is a non-porous electrically conductive tube, preferably of constant cross-sectional area. Suitable metals are nickel, pure iron (which is impermeable to many gases), stainless steel, and molybdenum, for example. In any event, the inner surfaces of the tube D should not react with the materials it contacts, including the gas involved. A typical sensor tube D is preferably about 0.040" to 0.060" outside diameter with a wall thickness of preferably about 0.005" to 0.015". Such tubes D are preferably about two to thirty feet long, although they may be longer or shorter.

FIG. 2 shows a portion of one preferred form of transducing agent E enclosed in the sensor tube D. Here the transducing agent E is a filament 10, such as zirconium or titanium or calcium wire, and may be about 0.025" to 0.050" in diameter, for example. A ribbon 11 of suitable material, such as molybdenum or tungsten, preferably about 0.020" wide and 0.002" thick, is wrapped tightly around the filamentary transducing agent 10. The ribbon 11 physically spaces the filament 10 from contact with the inside wall 12 of the tube D and prevents the transducing agent 10 from fusing or welding to the tube walls 12, even in the event that the sensor A is exposed to extreme heat and even if the filament 10 is fully ingassed, so that it is enlarged to nearly the internal diameter of the tube D. The invention as so far described is that of application Serial No. 102,622, and such a filament 10—ribbon 11 combination is used in most of the length of the sensor A of FIG. 1.

The new departure in the present invention is the provision, preferably at or near the end 13 of the tube D distant from the responder B, of a short length (e.g., about one foot in a sensor A that is twenty feet long) of a filament 14 of a metal which also ingasses and outgasses hydrogen but which has an outgassing temperature substantially lower than that of the metal comprising the main detecting filament 10. For example, if the filament 10 is zirconium, the filament 14 may be titanium or palladium. (If it is titanium, it will be wrapped in ribbon 11; if it is palladium, no wrapping is required.) If the filament 10 is titanium, the filament 14 may be palladium. This filament 14 is intended to extend only at the terminal end 13 of the tube D and preferably where it will not be subject to the fire temperatures which the filament 10 is intended to detect. The reasons for this addition will soon become apparent.

As a simplified example of installation of the sensor A to the responder B, one end 15 (FIG. 1) of the tube D may be brazed into an opening 16 of the responder B to provide a gas-tight seal, while the other end 13 of the tube D is still open. This free end 13 may be purged and evacuated. Then the tube D is heated, and pure hydrogen is forced in through the free end 13; the tube D is cooled, and both the filaments 10 and 14 absorb hydrogen while cooling, so that the originally pure metals 10 and 14 are converted into ingassed hydrides having somewhat different properties. The free end 13 is then sealed off as by inserting a brazing wire 17 and fusing it to the tube D, and the device is ready for operation except for the electrical wiring.

FIG. 1 shows one preferred form of responder B. This responder B has a thin flexible metal (e.g., molybdenum or "Kovar") disc or diaphragm 20 brazed between two circular plates 21 and 22, of non-porous metal, preferably molybdenum or "Kovar." (According to Handbook of Material Trade Names, 1953 Edition, published by Industrial Research Service at Dover, New Hampshire, "Kovar" is a registered trademark for an alloy of 20% nickel, 17% cobalt, 0.2% manganese, and the balance iron.) The plates 21 and 22 are hermetically sealed to the diaphragm and are in electrical contact therewith for their full peripheries and over a substantial margin. In its center the diaphragm 20 has a generally spherical-segment depression 23 called a "blister," which is free to move relative to the plates 21 and 22 and constitutes the active or movable part of the diaphragm 20. Use of a diaphragm 20 with a blister 23 makes possible the use of an upper plate 21 with a planar lower surface 23 and gives a more predictable response, but other diaphragm structures may be used where feasible. The lower plate 22 is formed with a recess 25 in its upper surface, and the diaphragm 20 divides the resultant cavity between the plates 21 and 22 into two regions or chambers 26 and 27. Since the lower region 26 communicates with the sensor A, it may be called the "sensor chamber." The other region 26 is located on the opposite side of the diaphragm 20 from the sensor A; so it may be called the "anti-sensor chamber." The sensor chamber 26 is closed and sealed except for its communication with the lumen of the sensor tube D; so the inside of the sensor A and the sensor chamber 26 enjoy a common atmosphere to the exclusion of any other.

A tube 28 of non-porous ceramic material or other non-porous electrically-insulating material extends through a stepped opening 29 provided by a metal tube 30 that is brazed into the upper plate 21 flush with the surface 24, the tube 28 being hermetically sealed in place with its lower end 31 flush with the bottom surface 24 of the plate 21. The hole 29 and tube 28 are preferably centered with respect to the blister 23. A metal rod 32, preferably of molybdenum, lies inside the tube 28 and serves as an electrode with a tip or contact portion 33 of the rod 32 lying flush with (or *very* slightly below) the lower surface 24 of the plate 21. When sufficient pressure is applied to the sensor side of the blister 23, the blister is deflected and makes contact with the electrode portion 33, and when the deflecting force is removed, the restoring force of the blister 23 returns it to its relaxed position and thus breaks contact with the electrode portion 33. The force necessary to deflect the blister 23 may be chosen by proper design to accommodate a wide range of values.

The outer end of the molybdenum rod 32 is preferably drilled axially to provide a receptacle 34 within which fits the end of a nickel capillary tube 35, which is secured to the rod 32, as by brazing, at a location short of the lower end 36 of the receptacle. A hole 37 extends radially through the wall of the receptacle 34 in between the receptacle end 36 and the end of the tube 35. A cap 38, preferably of "Kovar" or molybdenum, is brazed to the ceramic tube 28 and to the capillary tube 35, and the lengths of the tubes 28 and 35 and the rod 32 are carefully chosen to match the coefficients of expansion and the lengths of the two metal members 32 and 35 to the coefficient of expansion and the length of the member 28. It is important to keep the lower end 33 of the contact rod 32 from moving above the surface 24 of the plate 21. With the relative lengths of the molybdenum and nickel parts chosen so that their expansion and contraction exactly cancel those of the ceramic tube 28, whose coefficient of expansion lies between those of nickel and molybdenum, this distance is easily maintained.

The cylindrical rod 32 of molybdenum fits fairly snugly into the bore of the ceramic tube 28, while still leaving sufficient clearance for gas passage. The radial hole 37 enables passage of hydrogen gas or a mixture of hydrogen and a noble gas, such as argon or neon, through the capillary tube 35 into the ceramic tube 28. Hence, the nickel tube 35 may be used to introduce gas under pressure into the anti-sensor chamber 27 to provide any desired pressure there, with resultant effect on the response characteristics of the blister 23. It may then be closed off by inserting a wire 39 in its outer end and brazing it to the tube 35. Then the tube 35 may be brazed to an electrical jack or socket member 40. Thus, when the blister 23 contacts the electrode 33, electric current can pass from the blister 23 to the rod 32, the tube 35, and the socket 40, to which the electric warning circuit C is connected.

A simple electrical warning circuit C is shown in FIG. 3. It will be seen that a lead 41 connects the socket 40 to two lamps 42 and 43 in parallel with each other and in series with the lead 41 and a lead 44, which leads to one side of a battery 45. A lead 46 connects the other side of the battery 45 to a terminal 47, which may be on either plate 21 or 22 of the responder B.

When the blister 23 is not in contact with the electrode 33, the circuit through the battery 45 is open, and it cannot light the lamps 42 and 43. Whenever there is a fire or heat condition such as to emit sufficient gas inside the sensor A, the pressure in the sensor chamber 26 builds up and closes the blister 23, against the electrode 33, closing the circuit through the battery 45 and lighting the signal lamps 42 and 43.

The importance of the filament 14 which differentiates the sensor A of this invention from that of Serial No. 102,622, is in the test circuit F. A terminal 50 on the far end 13 of the sensor tube D is connected by a lead 51 to a test switch 52, which is connected to a second battery 53. The other side of the battery 53 may be grounded and a point 54 on the tube D just at the end of the filament 14 may also be grounded, so that when the switch 52 is closed, the filament 14 is heated and will outgas. The same thing may be achieved by connecting the other side of the battery 53 to the point 54 in a closed circuit. The battery power may be so adjusted that it heats the filament 14 but does not heat the filament 10 above the outgassing temperature.

For testing the circuit of FIG. 3, the switch 52 is closed. The sensor portion 14 is then heated electrically by the current passing from the battery 53 directly through a segment 55 of the metal tube D that surrounds the filament 14. I may, however, use any other suitable means for heating only the segment 55 and the portion 14 electrically. The heat is not uniformly distributed along the sensor A, but is concentrated at the filament 14. The sensor A is adjusted so that when the filament 14 is thus heated, it gives off enough hydrogen to increase the pressure in the tube D by an amount that will suffice to move the blister 23 against the electrode tip 33. If, however, the responder B is inoperative or if the sensor tube D leaks, or the system is for any reason inoperative, this fact will be disclosed by the non-operation of the test circuit. If and only if the system does work and is integral, the responder B completes the alarm circuit, lighting the warning lamps 42 and 43.

If there is a break in the sensor A or if the circuit C is broken or if there is a fault in some other part of the system, the warning lamps 42 and 43 will not light during the test, indicating that something is wrong with the system. Since it is the gas pressure in the sensor A which actuates the responder B during the test cycle, this test method gives a true test of the entire fire detector system by producing actual high temperature conditions in the sensor. By having the filament 14 outgas at a lower temperature than the filament 10, the main filament 10 is completely unaffected by the test.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

A heat detecting sensor of extended length comprising an imperforate tube containing a first metallic hydride occuping a major portion of said length that outgasses hydrogen when a first critical temperature is reached, and a second metallic hydride occupying a minor portion of said length and that outgasses hydrogen at a second critical temperature below said first critical temperature.

References Cited by the Examiner
UNITED STATES PATENTS 2,063,703  12/36  Siddall et al. _____ 340—229

FOREIGN PATENTS 11,393  3/14  Great Britain.

JULIUS E. WEST, *Primary Examiner.*

EDGAR W. GEOGHEGAN, *Examiner.*